3,017,337
REDUCTION OF DIPHENIMIDE
Hans Spiegelberg, Basel, and Bruno Peter Vaterlaus, Binningen, Switzerland, assignors to Hoffmann-La Roche Inc., Nutley, N.J., a corporation of New Jersey
No Drawing. Filed Apr. 17, 1959, Ser. No. 807,012
Claims priority, application Switzerland May 8, 1958
3 Claims. (Cl. 204—75)

This invention relates to an improved electrochemical process of making a chemical compound. More particularly, it relates to an electrochemical process for the preparation of 6,7-dihydro-5H-dibenz[c,e]azepine. The latter is an intermediate for the substance 6-allyl-6,7-dihydro-5H-dibenz[c,e]azepine, which is used in medicine as an adrenergic blocking agent under the non-proprietary designation azapetine (also known under the registered trademark Ilidar).

Broadly stated, the invention provides a process of making 6,7-dihydro-5H-dibenz[c,e]azepine which comprises electrolyzing diphenimide in acidulated aqueous medium.

In a preferred embodiment, the invention relates to a process of making 6,7-dihydro-5H-dibenz[c,e]azepine which comprises subjecting diphenimide, in an aqueous medium containing a mineral acid which is stable under the reaction conditions, to electrochemical reduction at a current density of from about 0.01 amp./sq. cm. to about 0.04 amp./sq. cm.

Preferred acidulating agents for use in the processes of the invention are, as indicated above, electrochemically stable mineral acids, sulfuric acid being especially preferred. The electrochemical reduction can be effected either upon a suspension of diphenimide in acidulated aqueous medium, or in a solution of diphenimide in similar medium. However, it is preferable to work with solutions, and for this purpose a medium comprising water, a lower alkanol (especially methanol or ethanol) and an electrochemically stable mineral acid (especially sulfuric acid) is preferred. It is especially advantageous to dissolve the diphenimide in a water miscible solvent and to introduce the resulting solution of diphenimide into the water-alcohol-acid medium. Suitable water miscible solvents are cycloaliphatic ethers (e.g. dioxane) and water miscible polymethylene glycol alkyl ethers (e.g. ethyleneglycol monomethyl ether). The reaction is advantageously effected at temperatures of from about 10° C. to about 50° C., and preferably at about prevailing room temperatures. Current densities of from about 0.01 amp./sq. cm. to about 0.04 amp./sq. cm. are suitable; but it is preferred to employ a current density of from about 0.015 amp./sq. cm. to about 0.02 amp./sq. cm. Non-reactive electrodes are employed, lead electrodes being preferred.

The invention is further disclosed in the following examples, which are illustrative but not limitative thereof.

*Example 1*

2.23 g. (0.0 mol) of diphenimide is dissolved in 40 cc. of warm dioxane. The resulting solution is added to 600 cc. of ethanol, which is diluted with 300 cc. of water and 50 cc. of concentrated sulfuric acid. The resulting solution is poured as catholyte into a porous clay cell. The clay cell is placed into 1500 cc. of an anolyte contained in a glass vessel and consisting of a mixture of ethanol:water:concentrated sulfuric acid in proportions by volume of 12:6:1. An electric current of 15 amp. is applied at a potential of 10–15 volts through a lead cathode having a surface area of 1510 sq. cm. and a lead anode having a surface area of 1750 sq. cm. for a period of 7 hours. At the end of this time the catholyte is concentrated in vacuo to about one-third its volume and is extracted with ether. The aqueous mother liquors from the catholyte are neutralized, while cooling, by reaction with solid sodium hydroxide, and the neutralized liquid is exhaustively extracted with ether. The ethereal extracts are combined and the ether is driven off, leaving a residue of 1.2 g. of basic material, which is converted to hydrochloride by reaction with hydrochloric acid. There are thus obtained colorless, fine needles of 6,7-dihydro-5H-dibenz[c,e]azepine hydrochloride, having M.P. of 288–288.5° C., in a yield of 1.02 g., equaling 44% of theory.

*Example 2*

10 g. of diphenimide is dissolved in 500 cc. of ethyleneglycol monomethyl ether by heating, and the solution is added to 1500 cc. of methanol. To the resulting solution are added 1000 cc. of water and 500 cc. of concentrated sulfuric acid. This solution is used as catholyte in similar manner to Example 1; the anolyte being 1500 cc. of a mixture of methanol:water:concentrated sulfuric acid in a proportion by volume of 4:2:1. A current of 20–25 amp. is applied for 30 hours at a potential of 10 volts through a lead cathode having a surface of 1510 sq. cm. and a lead anode having a surface of 1750 sq. cm., at a temperature of 20–25° C. After termination of the electrolysis, the catholyte is concentrated in a nitrogen atmosphere under diminished pressure to about 1.5 liters, and then is shaken with 1.5 liters of ether in order to remove the neutral constituents. The aqueous mother liquors from this extraction procedure are diluted with 2 liters of water and neutralized with solid sodium hydroxide while cooling well. The basic portions are extracted with 4 liters of ether. Upon drying the combined ethereal extracts and removing the solvent, there are obtained 5.9 g. of 6,7-dihydro-5H-dibenz[c,e]azepine (67.5% of theory). Distillation in a high vacuum yields the pure base as a pale green oil, B.P. 108–110° C./0.01 mm. Hg.

We claim:

1. A process for making 6,7-dihydro-5H-dibenz[c,e]-azepine which comprises adding diphenimide to a catholyte solution comprising water, a lower alkanol and sulfuric acid; passing an electric current through said catholyte by means of a lead cathode at a current density of from about 0.015 amp./sq. cm. to about 0.02 amp./sq. cm. to reduce said diphenimide; and recovering said 6,7-dihydro-5H-dibenz[c,e]azepine from the resulting catholyte solution.

2. A process for making 6,7-dihydro-5H-dibenz[c,e]azepine which comprises dissolving diphenimide in a water miscible solvent; mixing the resulting solution of diphenimide with a mixture of water, a lower alkanol and an electrochemically stable mineral acid to form a catholyte solution; passing an electric current through said catholyte solution by means of a lead cathode at a current density of from about 0.01 amp./sq. cm. to about 0.04 amp./sq. cm. to reduce said diphenimide; and recovering said 6,7-dihydro-5H-dibenz[c,e]azepine from the resulting catholyte solution.

3. A process for making 6,7-dihydro-5H-dibenz[c,e]azepine which comprises dissolving diphenimide in a water-miscible solvent selected from the group consisting of cycloaliphatic ethers and polymethylene glycol alkyl ethers; mixing the resulting solution with a mixture of water, an alcohol selected from the group consisting of methanol and ethanol, and sulfuric acid to form a catholyte solution; passing an electric current through said catholyte solution by means of a lead cathode at a current density of from about 0.015 amp./sq. cm. to about 0.02 amp./sq. cm. to reduce said diphenimide, and recovering said 6,7-dihydro-5H-dibenz[c,e]azepine from the resulting catholyte solution.

References Cited in the file of this patent

UNITED STATES PATENTS

| 2,693,465 | Schmidt et al. | Nov. 2, 1954 |
| 2,846,382 | Allen | Aug. 5, 1958 |